Figure 4:
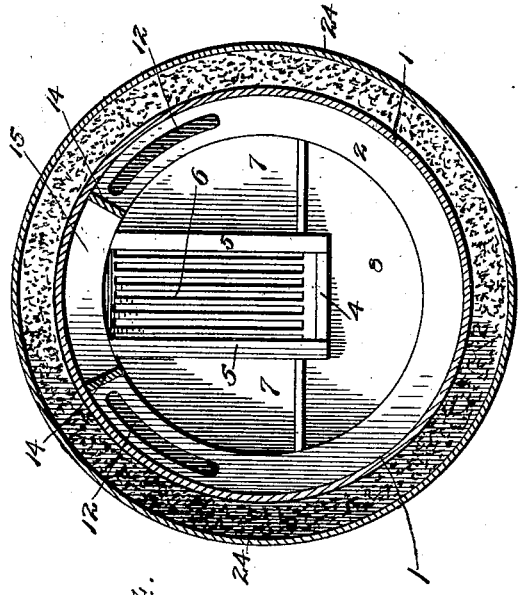

No. 622,327. Patented Apr. 4, 1899.
T. CALVERT.
CALCINING FURNACE.
(Application filed May 6, 1898.)
(No Model.) 2 Sheets—Sheet 1.
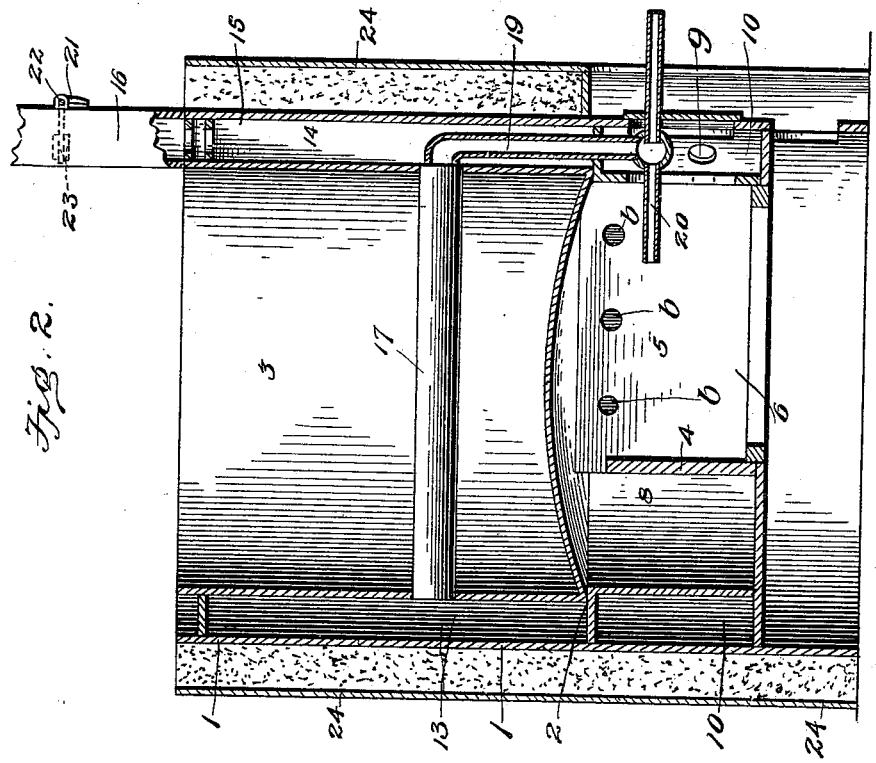
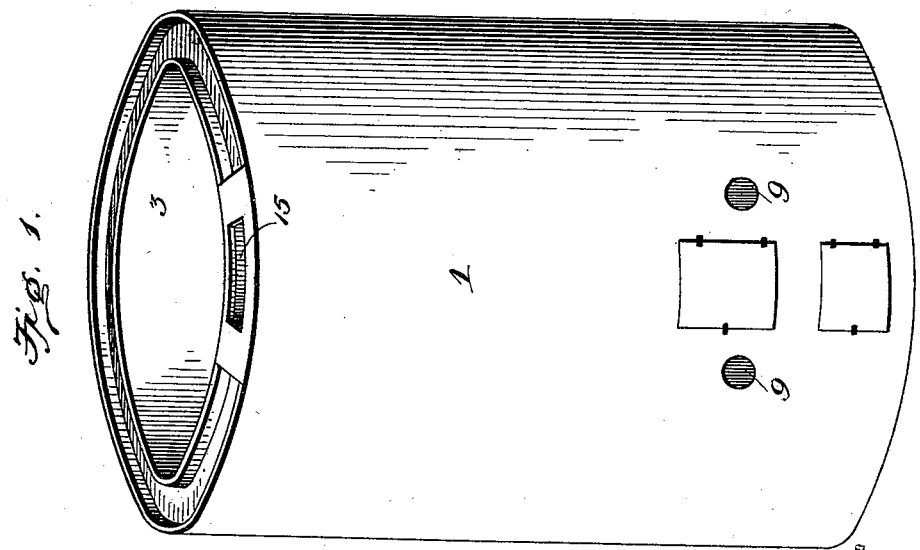
Witnesses Inventor
Todd Calvert
by
Attorneys
THE NORRIS PETERS CO., PHOTO-LITHO., WASHINGTON, D. C.

No. 622,327. Patented Apr. 4, 1899.
T. CALVERT.
CALCINING FURNACE.
(Application filed May 6, 1898.)

(No Model.) 2 Sheets—Sheet 2.

Witnesses Inventor
Todd Calvert,
by H. B. Willson & Co.
Attorneys

UNITED STATES PATENT OFFICE.

TODD CALVERT, OF TAMPA, KANSAS.

CALCINING-FURNACE.

SPECIFICATION forming part of Letters Patent No. 622,327, dated April 4, 1899.

Application filed May 6, 1898. Serial No. 679,945. (No model.)

*To all whom it may concern:*

Be it known that I, TODD CALVERT, a citizen of the United States, residing at Tampa, in the county of Marion and State of Kansas, have invented certain new and useful Improvements in Calcining-Furnaces; and I do declare the following to be a full, clear, and exact description of the invention, such as will enable others skilled in the art to which it appertains to make and use the same.

My invention relates to improvements in calcining-furnaces for gypsum; and the object is to simplify and improve the construction and reduce the time required for calcining by utilizing the heat to its fullest extent.

To this end the invention consists in the construction, combination, and arrangement of the device, as will be hereinafter more fully described, and particularly pointed out in the claim.

The accompanying drawings show my invention in the best form now known to me; but many changes in the details might be made within the skill of a good mechanic without departing from the spirit of this invention as set forth in the claim at the end of the specification.

The same reference characters indicate the same parts of the invention in the several views.

Figure 5:
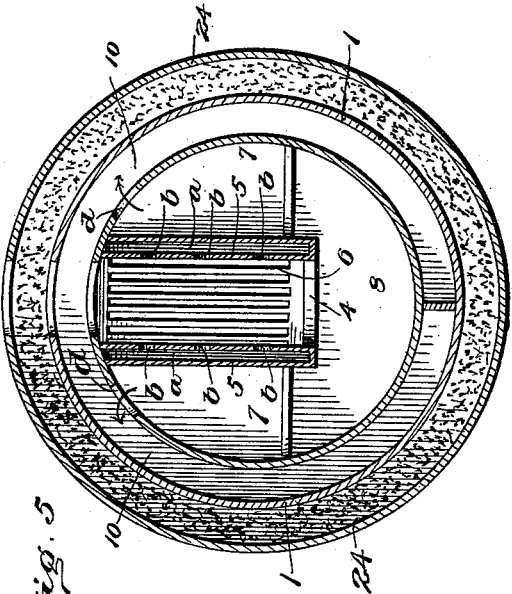
Figure 3:
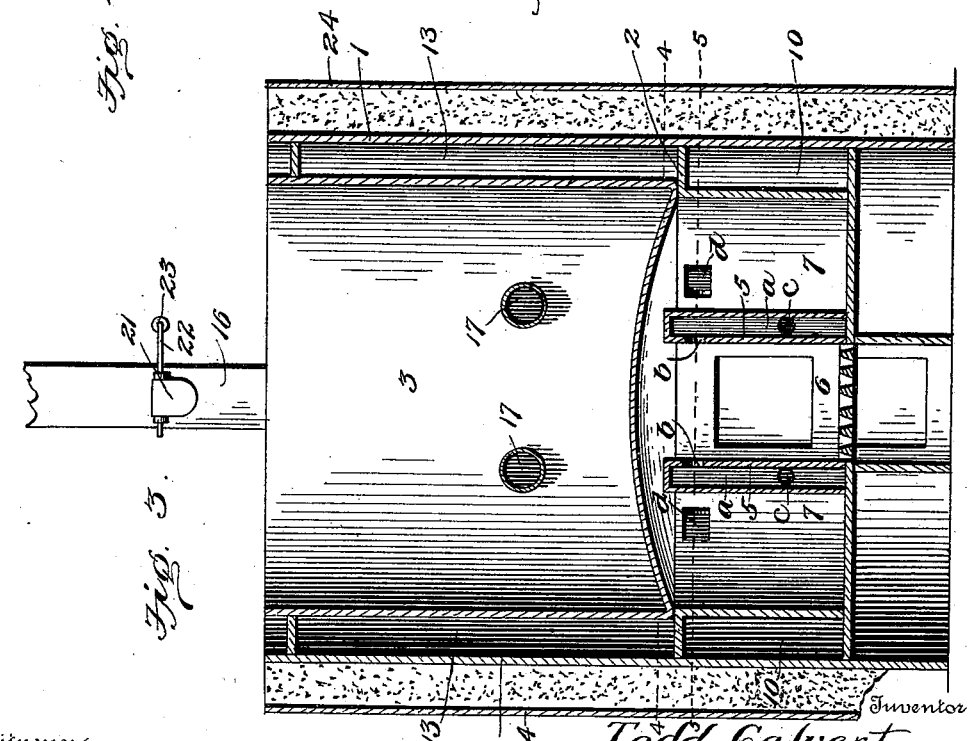

Figure 1 is a perspective view of my improved calcining-furnace with smoke-stack and the outside jacket or shell removed. Fig. 2 is a vertical section taken through the smoke-stack. Fig. 3 is a similar view taken at a right angle to Fig. 2. Fig. 4 is a horizontal section on the line 4 4 of Fig. 3 with the kettle removed. Fig. 5 is a similar view on the line 5 5 of Fig. 3.

1 denotes the cupola or furnace, formed with the horizontal ledge or shoulder 2, on which the kettle 3 rests.

4 denotes the bridge-wall, and 5 5 the parallel side walls, of the fire-chamber 6. These side walls 5 5 are formed with ducts $a$ $a$, having short lateral passages $b$ $b$, so as to admit atmospheric air into the fire-chamber 6 to assist in consuming the products of combustion, and the atmospheric air is admitted to the ducts in said side walls through the inlet-orifices $c$ $c$, formed in the front ends of said walls and which open into the chambers 10 10, which in turn communicate with the atmosphere through the openings 9 9, formed in the outside cupola-shell 1. These side walls extend upward to the bottom of the kettle, while the bridge-wall terminates at a point below the bottom of the kettle, to furnish a passage for the products of combustion from the furnace-chambers 7 7 and 8, located on opposite sides of and at the end of the fire-box.

9 9 denote suitable openings whereby access may be had to facilitate cleaning and the removal of soot and the like from the chambers 10 10, and from these chambers the passage-ways 12 12 extend into the annular chamber 13, formed between the inner wall of the furnace proper and the outer wall of the kettle.

14 14 denote vertical parallel partitions or walls which extend between the concentric walls of the kettle and furnace, the space between said vertical walls forming a smoke-flue 15, which communicates with the smoke-stack 16.

17 17 denote horizontal parallel flues fixed in the opposite walls of the kettle, their front ends opening into the vertical flue 15 and their rear ends communicating with the annular chamber 13, surrounding the kettle, so that the products of combustion will pass over the bridge-wall, thence into the chamber 8, and thence into the lateral combustion-chambers 7 7, thence through the passages $d$ $d$ into the segmental chambers 10 10 and through the passage-ways 12 12 into the annular chamber 13, surrounding the kettle, thence through the kettle by means of the flues 17 17, and thence into the vertical smoke-flue 15 and through the smoke-stack into the atmosphere. An auxiliary pipe 19 extends from the flues 17 17 to the fire-box, and it is provided with a steam-jet or air-blast pipe 20, by means of which the products of combustion may be returned from the kettle back to the furnace and then consumed, leaving only a colorless gas to escape from the smoke-stack.

21 denotes an automatic damper pivoted in the smoke-stack and provided with a lateral arm 22, carrying an adjustable counterbalancing-weight 23, which exactly and perfectly balances the damper, so that when there is an upward draft in the stack the damper will open upward and permit the escape of the unconsumed or partly-consumed products of combustion; but when these products are returned to the furnace to be consumed the damper will automatically close and prevent the admission of air through the stack, thus admitting air to the combustion-chambers through the furnace only.

24 represents an annular sheet-iron jacket or shell surrounding the furnace proper, and the intervening space between this shell and the furnace is filled with sand or similar refractory non-conducting material to exclude cold air from the furnace and reduce to a minimum any danger of fire from cracked walls.

Having thus fully described my invention, what I claim as new and useful, and desire to secure by Letters Patent of the United States, is—

A calcining-furnace, comprising the cupola 1, the kettle 3 arranged within said cupola, a vertical flue 15 and an annular chamber 13 arranged between said cupola and kettle, horizontal flues extending through the kettle and communicating with the chamber 13 and flue 15, a combustion-chamber 6 located beneath said kettle, parallel walls 5 5 extending on each side of the combustion-chamber and formed with ducts $a\ a$ for the admission of atmospheric air to said combustion-chamber and with inlet-orifices $c\ c$ communicating with the atmosphere, substantially as shown and described.

In testimony whereof I have hereunto set my hand in presence of two subscribing witnesses.

TODD CALVERT.

Witnesses:
J. M. RHODES,
G. P. SHULER.